(12) United States Patent
Massie

(10) Patent No.: US 6,839,785 B2
(45) Date of Patent: Jan. 4, 2005

(54) SYSTEM FOR AND METHOD OF INTERFACING EXPANSION MODULES WITH PROGRAMMABLE LOGIC CONTROLLERS (PLC)

(75) Inventor: Michael R. Massie, Bristol, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 474 days.

(21) Appl. No.: 09/957,347

(22) Filed: Sep. 20, 2001

(65) Prior Publication Data

US 2003/0023908 A1 Jan. 30, 2003

Related U.S. Application Data

(63) Continuation-in-part of application No. 09/814,221, filed on Mar. 21, 2001.

(51) Int. Cl.[7] .............................................. G06F 13/00
(52) U.S. Cl. ......................... 710/300; 710/305; 714/48
(58) Field of Search ................................ 710/300, 305; 714/47, 48, 49, 55, 700

(56) References Cited

U.S. PATENT DOCUMENTS

| | | | | | |
|---|---|---|---|---|---|
| 5,596,716 | A | * | 1/1997 | Byers et al. | 714/48 |
| 6,049,894 | A | * | 4/2000 | Gates | 714/41 |
| 6,122,747 | A | * | 9/2000 | Krening et al. | 713/323 |
| 6,654,909 | B1 | * | 11/2003 | Quach et al. | 714/30 |
| 6,697,903 | B2 | * | 2/2004 | Massie et al. | 710/305 |

* cited by examiner

Primary Examiner—Xuan M. Thai

(57) ABSTRACT

A communication interface involves a processor that communicates to expansion modules in order to read and write discrete input/output, analog input/output, intelligent module control, and expansion module status. The expansion modules can be application specific integrated circuits (ASIC), each having a state machine architecture that responds appropriately to the input/output expansion bus signals. The ASIC can include error detection using the first byte of messages from the controller. Thus, the ASIC detects when an erroneous message from the controller has been communicated and transmits a message to expansion modules that their output states not be changed in response to the message from the controller.

20 Claims, 25 Drawing Sheets

| Signal Name | Description |
|---|---|
| EMD | Expansion Module Data: Bi-directional signal used to communicate address and data to and from the expansion module. |
| EMC0 | Expansion Module Clock 0: Used to access expansion module I/O. Active only during bus transaction. Frequency = 4.125 MHz |
| XAOD | Address / Output Disable: Active Low, controlled by the CPU. Dual function signal:<br>XOD – Resets the EM. A long pulse, 10 times the clock period or greater. Received on EM with RC filter<br>XAS – Initiates ASIC state machine, one clock period pulse. |
| EMA[2:0] | Expansion Module Address: Daisy chained from PLC to module to module. Value input to a module becomes that modules address. The module shall output its address + 1 to the next module. The module closest to the PLC shall have an address of 0. A total of 7 EM can be connected (0:6) |
| +5V | 5 volt power supply – two signal lines |
| GND | Power supply return – two signal lines |

FIG. 1

| Pin # | Signal Name | ASIC Buffer Type | Signal Description |
|---|---|---|---|
| 1 | Vcc | +5V | ASIC +5V Power |
| 2 | MA_IN_0 | CMOS Input Buffer | Module Address 0, Active High |
| 3 | MA_IN_1 | CMOS Input Buffer | Module Address 1, Active High |
| 4 | MA_IN_2 | CMOS Input Buffer | Module Address 2, Active High |
| 5 | EMC_I | Input, Analog CMOS Schmitt Trigger | Inverting Clock Input, 4.125MHz Max. |
| 6 | EMC_N | Input, Analog CMOS Schmitt Trigger | Non-inverting Clock Input, 4.125MHz Max. |
| 7 | ANA_TYPE | TTL Input Buffer | ANA_TYPE = 0 (Mode 2), ANA_TYPE = 1 (MODE 1) Selects Mode 2 or Mode 1 Operation only when the ID_BUF is decoded to be an analog type |
| 8 | XAS | Input, Analog CMOS Schmitt Trigger | Initiates State Machine, Active Low Strobe |
| 9 | ID_BUF_6 | TTL Input Buffer | ID Register bit 6<br>ID register identifies Module Type and determines ASIC mode of operation |
| 10 | XOD | Input, Analog CMOS Schmitt Trigger | Master Reset, Active Low |
| 11 | ID_BUF_5 | TTL Input Buffer | ID Register bit 5, see ID_BUF_6 for description |
| 12 | EMD | 8mA Bidi, CMOS Buffer with Schmitt Trigger | Bi-directional Data Signal |
| 13 | Vcc | +5V | ASIC +5V Power |
| 14 | GND | GND | ASIC +5V Return |
| 15 | ID_BUF_4 | TTL Input Buffer | ID Register bit 4, see ID_BUF_6 for description |
| 16 | EMD_NEXT_EM | 8mA Bidi, CMOS Buffer with Schmitt Trigger | Bi-directional Data Signal for Next Module |
| 17 | ID_BUF_3 | TTL Input Buffer | ID Register bit 3, see ID_BUF_6 for description |
| 18 | ASIC_XAOD | 8mA Output Buffer | Next Modules XAOD, Active Low |
| 19 | ID_BUF_2 | TTL Input Buffer | ID Register bit 2, see ID_BUF_6 for description |
| 20 | ID_BUF_1 | TTL Input Buffer | ID Register bit 1, see ID_BUF_6 for description |
| 21 | EMC_O | 8mA Output Buffer | Non-inverting Clock Output, for Next Module |
| 22 | ID_BUF_0 | TTL Input Buffer | ID Register bit 0, see ID_BUF_6 for description |
| 23 | MA_OUT_2 | 6mA Output Buffer | Next Module Address 2, Active High |
| 24 | MA_OUT_1 | 6mA Output Buffer | Next Module Address 1, Active High |
| 25 | MA_OUT_0 | 6mA Output Buffer | Next Module Address 0, Active High |
| 26 | Vcc | +5V | ASIC +5V Power |
| 27 | GND | GND | ASIC +5V Return |
| 28 | EXP4 | 8mA Bidi, CMOS Buffer with Schmitt Trigger | Mode 0: WDTO, not used, pull low<br>Mode 1: WDTO, input, enable - low, disable - high WDTO (watchdog time out) from local processor<br>Mode 2: LD_DAC, Active low pulse, loads DAC output on rising edge, always output in mode 2 |
| 29 | WR_DAC_0 | 10mA Output Buffer | Load CH0 DAC registers, Active Low |
| 30 | WR_DAC_1 | 10mA Output Buffer | Load CH1 DAC registers, Active Low |
| 31 | EXT1_0 | 10mA Output Buffer | External Port 1, Bit 0<br>Mode 0: 8 Discrete Output Points, Active Low<br>Mode 1: Output Address & Control<br>Mode 2: Analog I/O Address & Control |
| 32 | EXT1_1 | 10mA Output Buffer | External Port 1, Bit 1, see EXT1_0 for mode operation |
| 33 | EXT1_2 | 10mA Output Buffer | External Port 1, Bit 2, see EXT1_0 for mode operation |
| 34 | EXT1_3 | 10mA Output Buffer | External Port 1, Bit 3, see EXT1_0 for mode operation |
| 35 | EXT1_4 | 10mA Output Buffer | External Port 1, Bit 4, see EXT1_0 for mode operation |
| 36 | EXT1_5 | 10mA Output Buffer | External Port 1, Bit 5, see EXT1_0 for mode operation |
| 37 | EXT1_6 | 10mA Output Buffer | External Port 1, Bit 6, see EXT1_0 for mode operation |
| 38 | EXT1_7 | 10mA Output Buffer | External Port 1, Bit 7, see EXT1_0 for mode operation |
| 39 | Vcc | +5V | ASIC +5V Power |
| 40 | GND | GND | ASIC +5V Return |
| 41 | EXP2 | Input, Analog CMOS Schmitt Trigger | Mode 0: CLK_IN, Watch dog timer clock input<br>Mode 1: CLK_IN, Watch dog timer clock input<br>Mode 2: PS_DETECT, detects +24V power fault |
| 42 | EXP1 | 6mA Output Buffer | Mode 0: CLK_OUT, Watch dog timer feedback clock<br>Mode 1: CLK_OUT, Watch dog timer feedback clock<br>Mode 2: DAC_CLR_L, used to clear DAC's |
| 43 | EXP0 | 10mA Output Buffer | Mode 0: EXT_CLR, output clear<br>Mode 1: EXT_CLR, output clear<br>Mode 2: ADDR_DAC, Address DAC Byte |
| 44 | EXT0_7 | 10mA Bidi TTL Buffer | External Port 0, Bit 7<br>Mode 0: 8 Discrete Input Points, Active High<br>Mode 1: Bi-directional Data Bus<br>Mode 2: Bi-directional Data Bus |
| 45 | EXT0_6 | 10mA Bidi TTL Buffer | External Port 0, Bit 6, see EXT0_7 for mode operation |
| 46 | EXT0_5 | 10mA Bidi TTL Buffer | External Port 0, Bit 5, see EXT0_7 for mode operation |
| 47 | EXT0_4 | 10mA Bidi TTL Buffer | External Port 0, Bit 4, see EXT0_7 for mode operation |
| 48 | EXT0_3 | 10mA Bidi TTL Buffer | External Port 0, Bit 3, see EXT0_7 for mode operation |
| 49 | EXT0_2 | 10mA Bidi TTL Buffer | External Port 0, Bit 2, see EXT0_7 for mode operation |
| 50 | EXT0_1 | 10mA Bidi TTL Buffer | External Port 0, Bit 1, see EXT0_7 for mode operation |
| 51 | EXT0_0 | 10mA Bidi TTL Buffer | External Port 0, Bit 0, see EXT0_7 for mode operation |
| 52 | GND | GND | ASIC +5V Return |

FIG. 5

| ID_BUF (hex) | ANA_TYPE | ASIC Mode | Module Type |
|---|---|---|---|
| 01 | 0 | 0 | Discrete I/O 8 inputs / 8 outputs or less |
| 04 | 0 | 0 | Discrete I/O 8 inputs / 8 outputs or less |
| 05 | 0 | 0 | Discrete I/O 8 inputs / 8 outputs or less |
| 11 | 0 | 2 | Analog Type |
| 12 | 0 | 2 | Analog Type |
| 14 | 0 | 2 | Analog Type |
| 18 | 0 | 2 | Analog Type |
| 15 | 0 | 2 | Analog Type |
| 16 | 0 | 2 | Analog Type |
| 19 | 0 | 2 | Analog Type |
| 1A | 0 | 2 | Analog Type |
| 11 | 1 | 1 | Analog Type |
| 12 | 1 | 1 | Analog Type |
| 14 | 1 | 1 | Analog Type |
| 18 | 1 | 1 | Analog Type |
| 15 | 1 | 1 | Analog Type |
| 16 | 1 | 1 | Analog Type |
| 19 | 1 | 1 | Analog Type |
| 1A | 1 | 1 | Analog Type |
| All others | 0 | 1 | All intelligent modules or Discrete I/O greater than 8 inputs / 8 outputs |

FIG. 8

| EXT1 | Mode 1 | Description |
|---|---|---|
| bit 7 | CS | Chip Select, Active Low, OR'd condition of WRSTRB & RDSTRB |
| bit 6 | Busy | Active Low, indicates activity on the EXT0 & EXT1 |
| bit 5 | WRSTRB | Write Strobe: Active Low |
| bit 4 | RDSTRB | Read Strobe: Active Low |
| bit 3 | RA3 | Register Address Bit 3, Active High |
| bit 2 | RA2 | Register Address Bit 2, Active High |
| bit 1 | RA1 | Register Address Bit 1, Active High |
| bit 0 | RA0 | Register Address Bit 0, Active High |

FIG. 9

| ASIC Signal Name | Signal Description |
|---|---|
| EXT1(7) => (STATUS_REG_2) | Read Enable Buffer R3, Active low |
| EXT1(6) => (STATUS_REG_1) | Read Enable Buffer R2, Active low |
| EXT1(5) => (STATUS_REG_0) | Read Enable Buffer R1, Active low |
| EXT1(4) => (MUX_SEL) | MUX Select Strobe<br>Low – transparent mode, High – previous address is latched |
| EXT1(3) => (MUX_ADDR_1) | MUX address bit 1 |
| EXT1(2) => (MUX_ADDR_0) | MUX address bit 0 |
| EXT1(1) => (ADC_RD) | Read ADC / Initiate Conversion Strobe<br>Low – enables outputs when chip is selected<br>- also initiates conversion when chip is selected and ADC_BYTE_SEL is low |
| EXT1(0) => (ADC_BYTE_SEL) | High Byte / Low Byte Select Signal<br>High – enables 4 MSB's onto parallel bus, also disables conversion<br>Low – enables 8 LSB's onto parallel bus |

FIG. 10

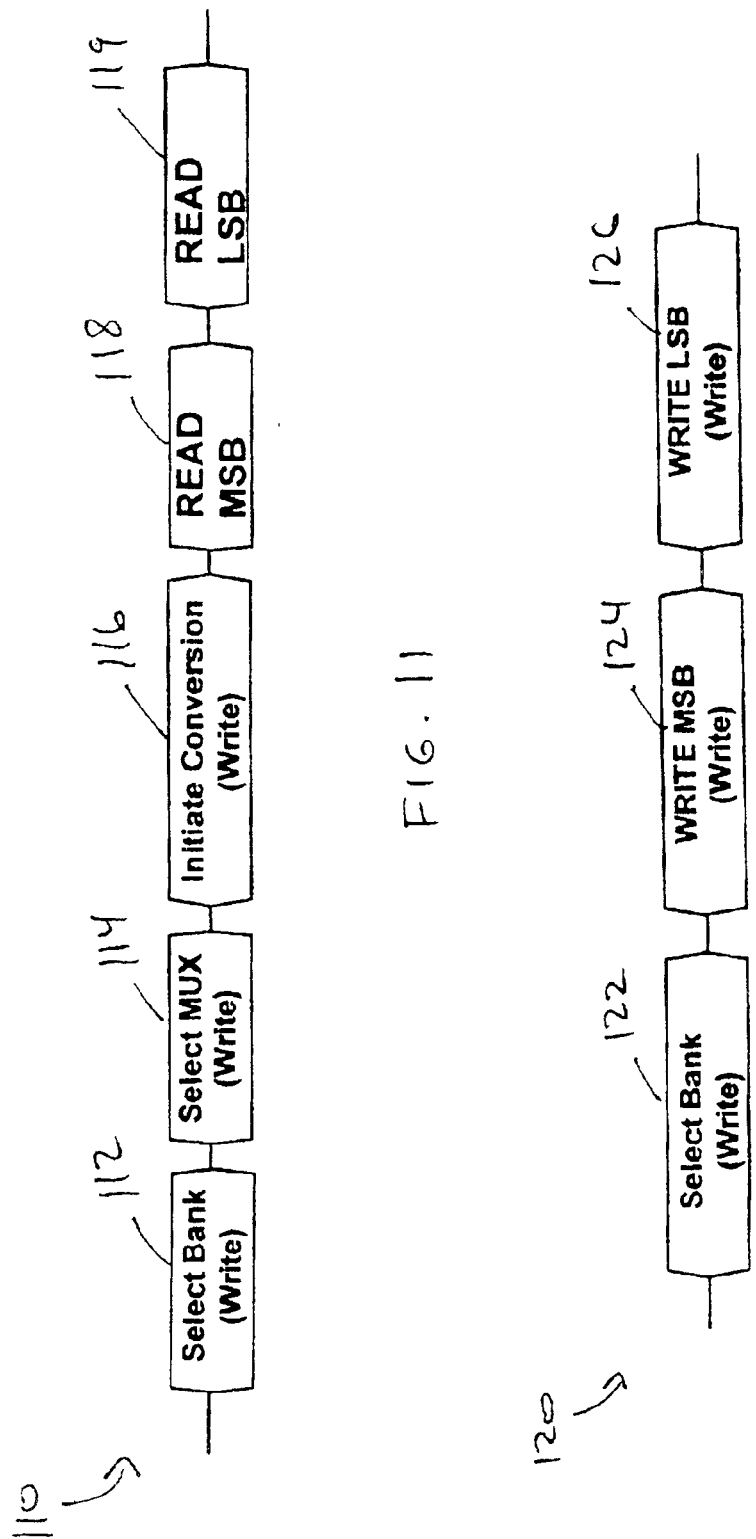

SYSTEM FOR AND METHOD OF INTERFACING EXPANSION MODULES WITH PROGRAMMABLE LOGIC CONTROLLERS (PLC)

CROSS-REFERENCE TO RELATED APPLICATIONS

The present application is a continuation-in-part (CIP) application of U.S. patent application Ser. No. 09/814,221, entitled "Slave ASIC", filed on Mar. 21, 2001, by Michael R. Massie and Alan McNutt and assigned to the same assignee as the present application. The present application claims priority to this prior application and incorporates it by reference in its entirety.

FIELD OF THE INVENTION

The present invention relates generally to interfacing control modules to other modules. More particularly, an exemplary embodiment of the present invention relates to interfacing expansion modules with programmable logic controllers (PLCs).

BACKGROUND OF THE INVENTION

Heretofore, interfaces have been used that interface a control module to other modules. However, no universal interface for interfacing a plurality of communications protocol was available until the system and method particularly contemplated by the invention described and claimed in U.S. patent application Ser. No. 09/814,221, entitled "Slave ASIC", incorporated herein by reference in its entirety.

Nevertheless, there is a need for an improved system for and method of interfacing expansion modules with programmable logic controllers (PLCs). Further, there is a need to detect the presence of an error on the first byte of a communication signal to prevent writing out invalid data.

SUMMARY OF THE INVENTION

The present invention relates to a communication interface for expansion modules used with programmable logic controllers. This communication interface involves a processor that communicates to expansion modules in order to read and write discrete input/output, analog input/output, intelligent module control, and expansion module status. In one embodiment, these expansion modules are application specific integrated circuits (ASIC). The ASIC has a state machine architecture that responds appropriately to the input/output expansion bus signals. In an exemplary embodiment, intelligence is included in the ASIC whereby error detection is made from the first byte of messages from the controller. Thus, the ASIC detects when an erroneous message from the controller has been communicated and transmits a message to expansion modules that their output states not be changed in response to the message from the controller. As such, the erroneous message is ignored by the expansion modules.

An exemplary embodiment is related to a method of preventing the writing out of invalid data by a communication interface that interfaces a controller and input/output (I/O) devices. This method can include decoding a control byte in a message communicated from a controller to an application specific integrated circuit (ASIC), determining which expansion module (EM) of a number of expansion modules is being addressed by the controller and what type of message is being communicated, generating parity bits, comparing the generated parity bits to parity bits attached to the control byte, and, if the parity bits do not match, issuing a signal to preserve output states for the number of expansion modules.

Another exemplary embodiment is related to a communication interface apparatus that responds to a communication protocol for interfacing expansion modules for reading and writing discrete input/output (I/O), analog I/O, intelligent module control and expansion module status. The apparatus can include means for decoding a control byte in a message communicated from a controller, means for determining which expansion module (EM) of a number of expansion modules is being addressed by the controller and what type of message is being communicated, means for generating parity bits, means for comparing the generated parity bits to the parity bits attached to the control byte, and means for issuing a signal to preserve output states for the number of expansion modules if the parity bits do not match.

Another exemplary embodiment is related to a system that provides serial communication to expansion modules to read and write discrete input/output, analog input/output, intelligent module control, and expansion module status. This system can include state machine architecture that provides communication and control to a number of expansion modules and a controller that provides to the state machine architecture read messages and write messages. The first byte of the read messages and write messages include control information and parity bits. The state machine architecture is configured to: decode the control information from the controller, determine which of the number of expansion modules is being addressed by the controller and whether the message from the controller is a read or write message, generate test parity bits, compare the parity bits from the controller with the test parity bits, and communicate an error detection signal to the number of expansion modules if the parity bits from the controller and the test parity bits do not match.

Other principle features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements, and:

FIG. 1 is a table of input/output (I/O) expansion bus signals as viewed by an expansion module (EM);

FIG. 5 is a table of ASIC pin assignments, signal names, buffer types, and signal descriptions;

FIG. 8 is a table of ASIC modes according to various values;

FIG. 9 is a table of address and control parts used in mode 1 of operation;

FIG. 10 is a table of bus signals used in mode 2 of operation;

FIG. 11 is a block diagram of an analog input access sequence by the PLC;

FIG. 12 is a block diagram of an analog output access sequence by the PLC;

DETAILED DESCRIPTION OF THE EXEMPLARY EMBODIMENTS

A system for and method of interfacing expansion modules with programmable logic controllers (PLCs) are described. In the following description, for purposes of explanation, numerous specific details are set forth in order to provide a thorough understanding of the present invention. It will be evident, however, to one skilled in the art that the exemplary embodiments may be practiced without these specific details. In other instances, structures and devices are shown in block diagram form in order to facilitate description of the exemplary embodiments.

In an exemplary embodiment, an interface of the present invention provides serial communication to expansion modules (EM). A CPU of the interface controls all communications to and from the EM's and is referred to herein as the "Master Function". The Expansion Module includes an ASIC to achieve this serial communication protocol and will be referred to as the "Slave Function" or "Slave ASIC".

FIG. 1 illustrates a table 10 of exemplary input/output (I/O) expansion bus signals as viewed by an expansion module (EM). The connection from the PLC to the EM and from EM to EM is preferably 1 to 1 using a 10 pin header type connection.

Figure 2:
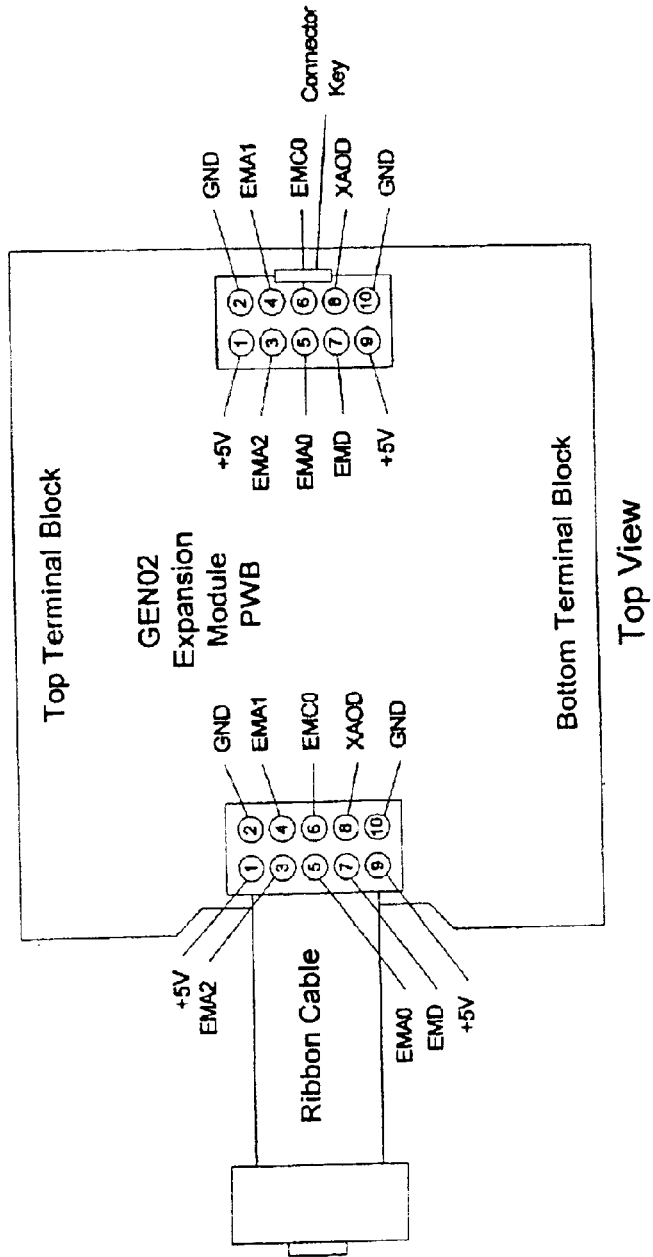
FIG. 2 is an expansion module printed wiring board (PWB) diagram 20 showing expansion bus pin assignments and connector key orientations.

FIG. 2 illustrates an exemplary expansion module printed wiring board (PWB) diagram 20 showing expansion bus pin assignments and connector key orientations.

Figure 3:
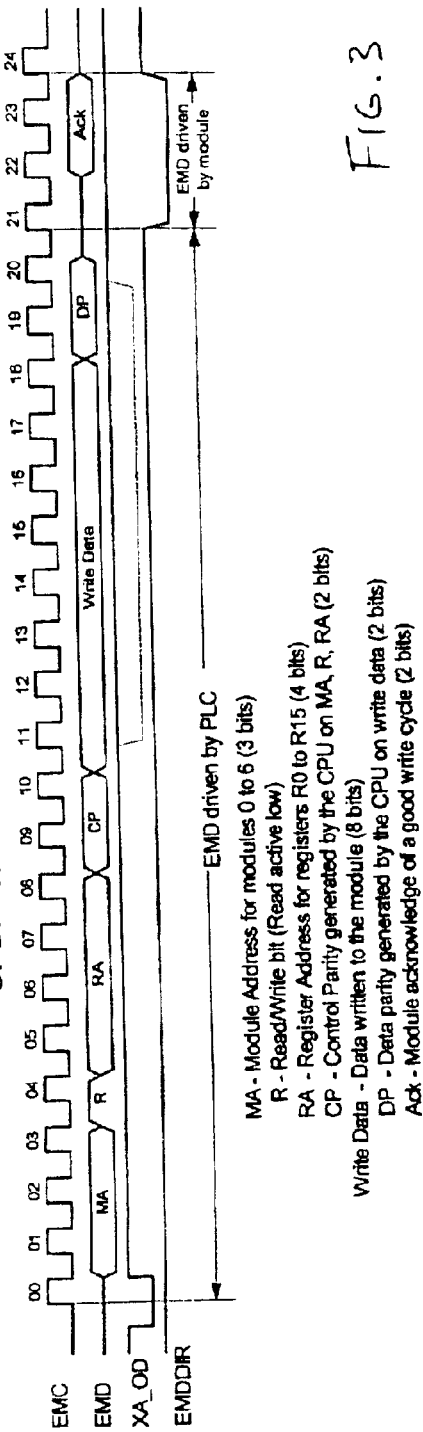
FIG. 3 is a signal diagram of an expansion bus write cycle transaction.
Figure 4:
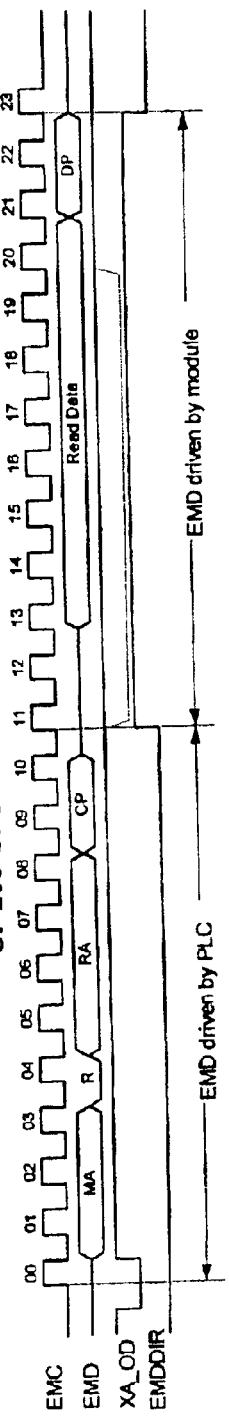
FIG. 4 is a signal diagram of an expansion bus read cycle transaction.

FIGS. 3-4 illustrate an expansion bus read cycle and write cycle sequence. A bus transaction is initiated by short active low pulse on XA_OD signal. In FIG. 3:

MA—Module Address for modules 0 to 6 (3 bits)
R—Read/Write bit (Read active low)
RA—Register address for registers R0 to R15 (4 bits)
CP—Control parity generated by the CPU on MA, R, RA (2 bits)
Write Data—Data written to the module (8 bits)
DP—Data parity generated by the CPU on write data (2 bits)
Ack—Module acknowledge of a good write cycle (2 bits)

In FIG. 4:
MA—Module Address for modules 0 to 6 (3 bits)
R—Read/Write bit (Read active low)
RA—Register address for registers R0 to R15 (4 bits)
CP—Control parity generated by the CPU on MA, R, RA (2 bits)
Read Data—Data read from the module (8 bits)
DP—Data parity generated by the CPU on write data (2 bits)

FIG. 5 illustrates a table 50 showing pin assignments, signal names, buffer types, and signal descriptions for an EM SLAVE ASIC. The input/output (I/O) of the ASIC accommodates all Expansion Module I/O configurations. That is, the ASIC is a universal interface. The universality is accomplished by implementing multiple modes of operation within the ASIC. These multiple modes of operation are described further below with reference to FIGS. 15-31.

Figure 6:
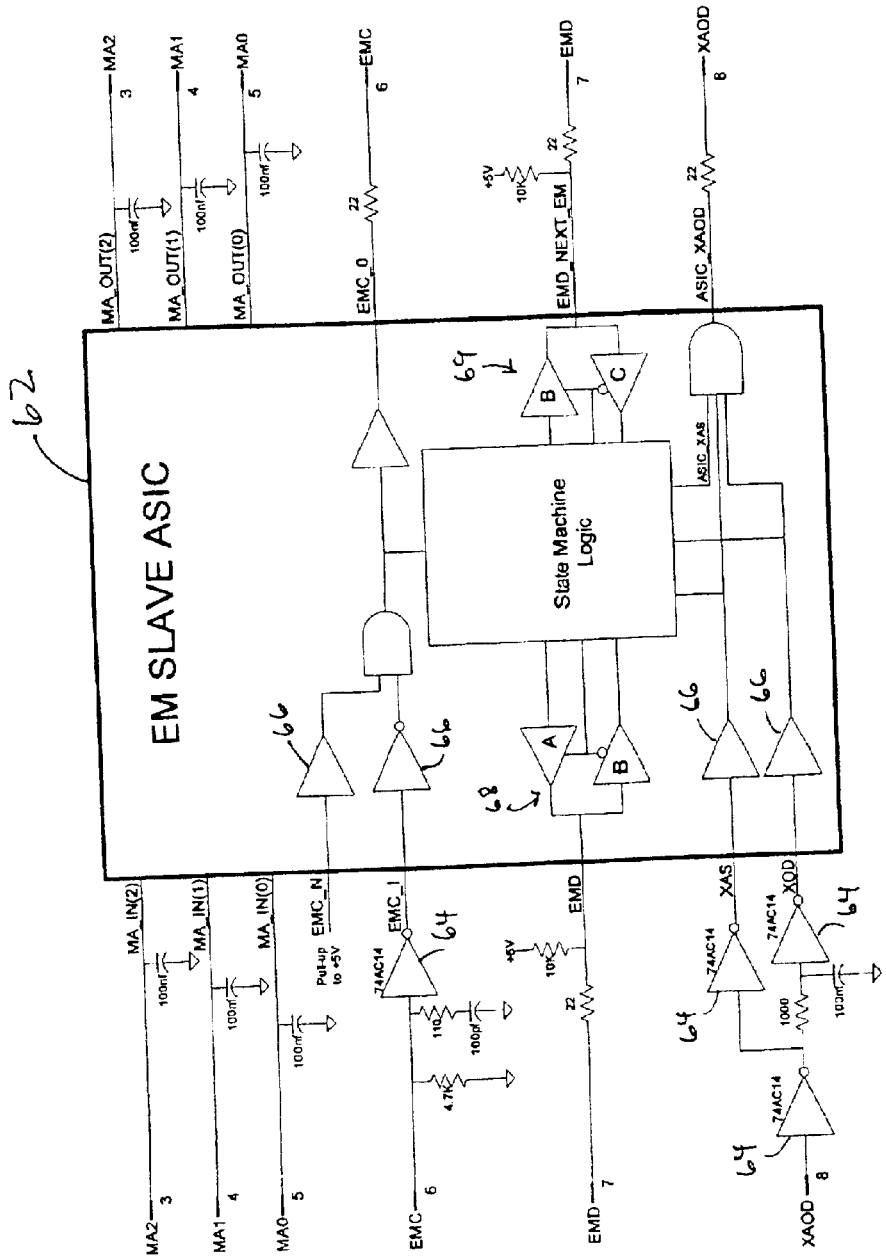
FIG. 6 is a circuit diagram illustrating an expansion module (EM) slave application specific integrated circuit (ASIC) connected to an I/O expansion bus.

FIG. 6 illustrates an expansion module (EM) SLAVE ASIC 62 connected to an I/O expansion bus. External hysteresis gates 64 provide additional hysteresis to ensure the quality of the clock is maintained. In addition to external hysteresis gates 64, EM SLAVE ASIC 62 implements analog schmitt trigger input buffers 66 on all critical input signals to guard against electrical noise disturbances. The analog schmitt trigger inputs are applied to EMC_I, EMC_N, XAS, XOD, and EXP2 input signals.

EM SLAVE ASIC 62 has been designed so that external hysteresis gates 64 can be removed. Only one clock input is active and the other clock input is pulled to the appropriate state. The data signal, EMD, on the I/O expansion bus is a bi-directional signal and the direction control and buffering are controlled by EM SLAVE ASIC 62.

EM SLAVE ASIC 62 is designed to receive and re-transmit the I/O expansion bus signals to the next module downstream or to re-transmit data from a module downstream back to the PLC. Signals XAS and XOD are derived from the I/O expansion bus signal XAOD. The XAS signal follows the XAOD signal and a short active low pulse (1 clock period) that is sampled on the rising clock edge initiates a bus transaction. The signal XOD filters out the short active low pulse, XAS, and becomes valid only when XAOD has been low for 10 $\mu$sec or more. Signal XOD is an asynchronous input into the ASIC and resets the ASIC AND CLEARS ALL OUTPUTS. The output signal, ASIC_XAOD, is used as the XAOD input to the next module downstream. This output signal includes the XAS and XOD functions with the addition of an ASIC generated synchronous XAS signal (ASIC_XAS). The ASIC_XAS becomes active low when a parity error has been detected on the first byte of the bus message and remains low for approximately 2.2 $\mu$sec. Modules downstream detect an active XAS, thus preserving the output data.

The input module address, MA_IN[2:0], is latched when XOD releases on power up and can only change when XOD is low. The next module address, MA_OUT[2:0], is generated by incrementing the input module address by one and is transmitted to the next module downstream. The first expansion module has module address of zero and a total of eight expansion modules can be cascaded.

EM SLAVE ASIC 62 provides two bi-directional buffers 68 and 69 to properly handle the data signal on the I/O expansion bus. The EMD buffer (bi-directional buffer 68) transmits and receives data with a PLC or with an expansion module upstream (an expansion module of lesser physical address). Bi-directional buffer 69, EMD_NEXT_EM, transmits and receives data with an expansion module downstream (an expansion module of a greater physical address). The direction of bi-directional buffers 68 and 69 is controlled by the state machine logic of EM SLAVE ASIC 62 as follows. EMD buffer 68 defaults as an input and changes to an output when EM SLAVE ASIC 62 has determined the PLC has addressed that module or a module with a greater address and a response is being requested. EMD_NEXT_EM buffer 69 defaults as an output and changes to an input when EM SLAVE ASIC 62 has determined a module having a greater address than itself has been requested to respond to the PLC. The EMD_NEXT_EM signal drives the data bus low during a response to the PLC when it has been addressed or a module upstream has been addressed.

EM SLAVE ASIC 62 provides a non-inverting (EMC_N) and an inverting clock (EMC_I) inputs. When external hysteresis gates 64 are used, the inverting clock input is active and the non-inverting clock inputs pulled high. In the case no hysteresis gates are used, then the non-inverting clock input is active and the inverting clock input is pulled low. In either case the, EM SLAVE ASIC 62 outputs a non-inverting clock, EMC_O, to the next module downstream.

Figure 7:
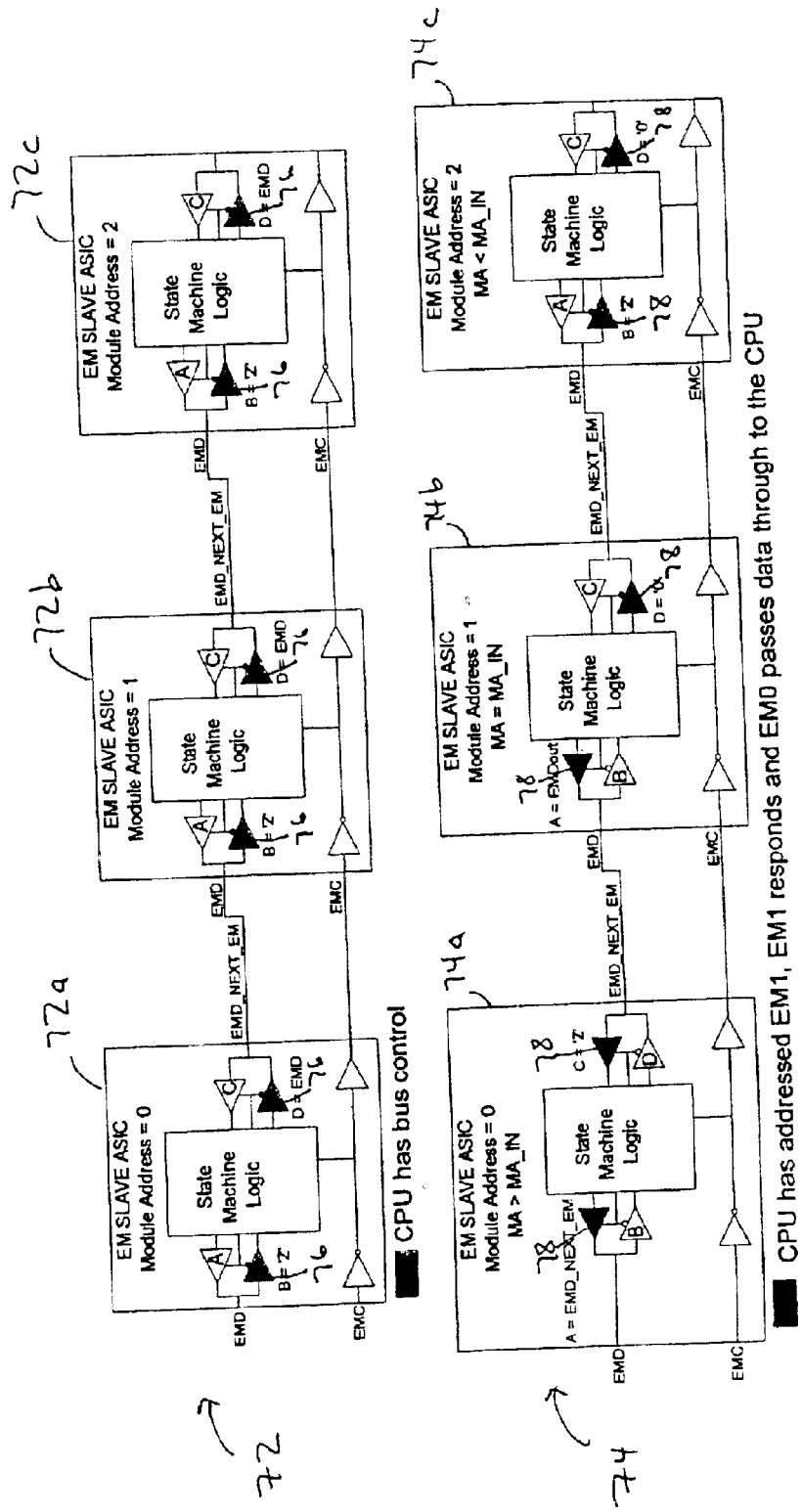
FIG. 7 is a set of ASIC modules connected together.

FIG. 7 illustrates an ASIC series 72 (ASIC 72*a*, 72*b*, 72*c*) and an ASIC series 74 (ASIC 74*a*, 74*b*, 74*c*). ASIC series 72 is a collection of three connected ASIC modules where the CPU has control. Buffers 76 (shown in shaded color) are in use when the CPU has control. ASIC series 74 is a collection of three connected ASIC modules having addresses 0, 1, and 2. ASIC series 74 shows the state of operation where the CPU has addressed EM module 74*b* and EM module 74*b* responds and EM module 74*a* passes data through to the CPU. Buffers 78 are used in this operation.

FIG. 8 provides a table 80 listing the ASIC mode according to the ID_BUF and ANA_TYPE values. EM SLAVE ASIC 62 has three modes of operation to support all types of expansion modules. The identification Register (ID_BUF) is input into the ASIC at initial power and its value is decoded by the ASIC to determine the mode of operation. The input signal, ANA_TYPE, is used to select between mode 1 or mode 2 operation when the ID_BUF has been decoded to be of an analog type.

EM SLAVE ASIC mode 0 provides eight discrete inputs and eight discrete outputs and does not require external registers. Mode 0 is referred to as the discrete mode.

In mode 0, the EXT0 port operates as an 8 bit data input port and EXT1 port operates as an active low, 8 bit data output port. The function of signals EXP0, EXP1, and EXP2, and EXP4 are mode dependent. In mode 0, signals EXP0, EXP1, and EXP2 are used for the watch dog timer function, described further below with respect to FIGS. 13-14.

EM SLAVE ASIC mode 1 provides a bus interface used by intelligent modules, analog modules with an on board microprocessor or modules requiring more than eight inputs and eight outputs. Mode 1 can be referred to as the bus interface mode.

Figure 21:
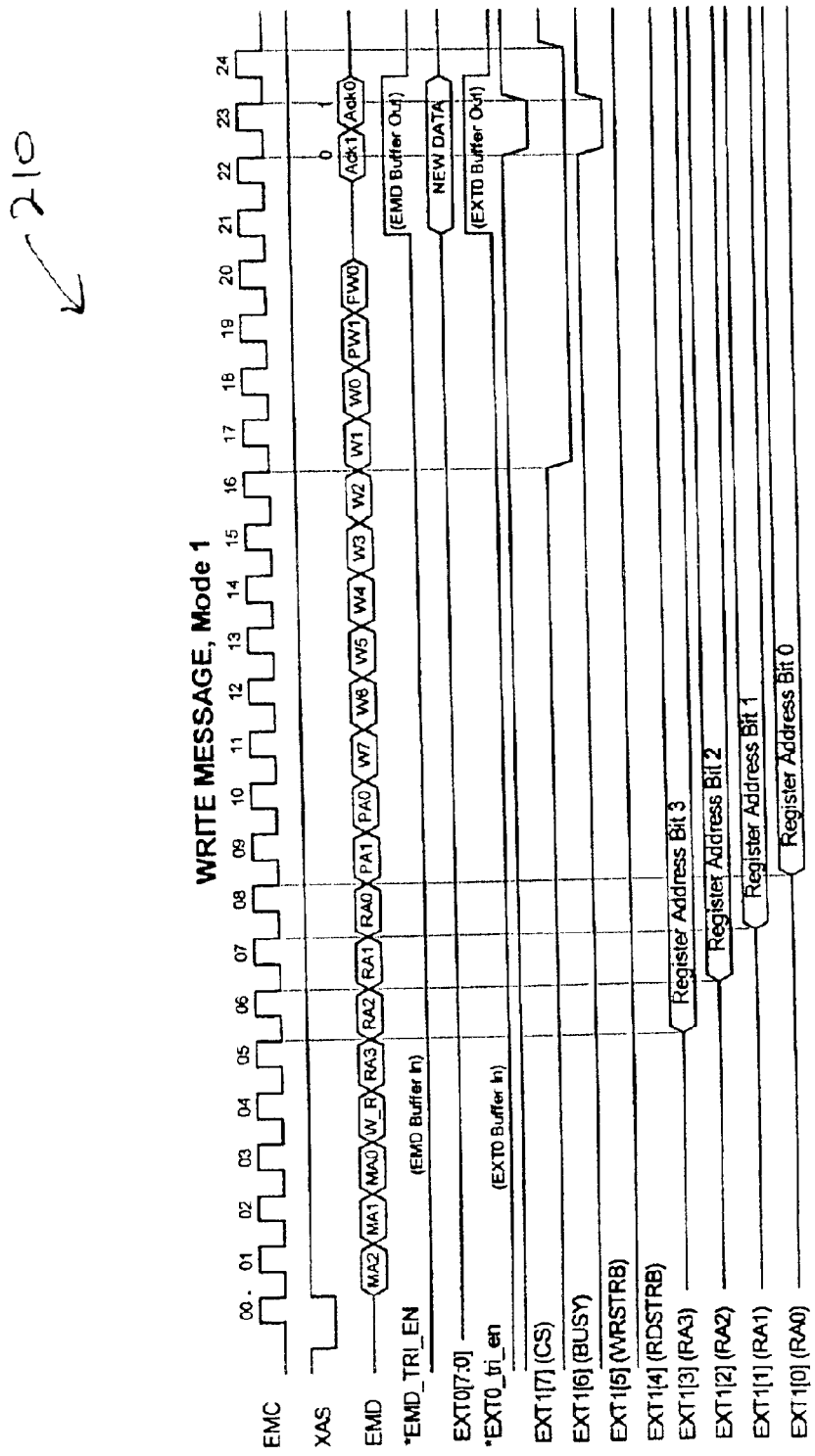
Figure 22:
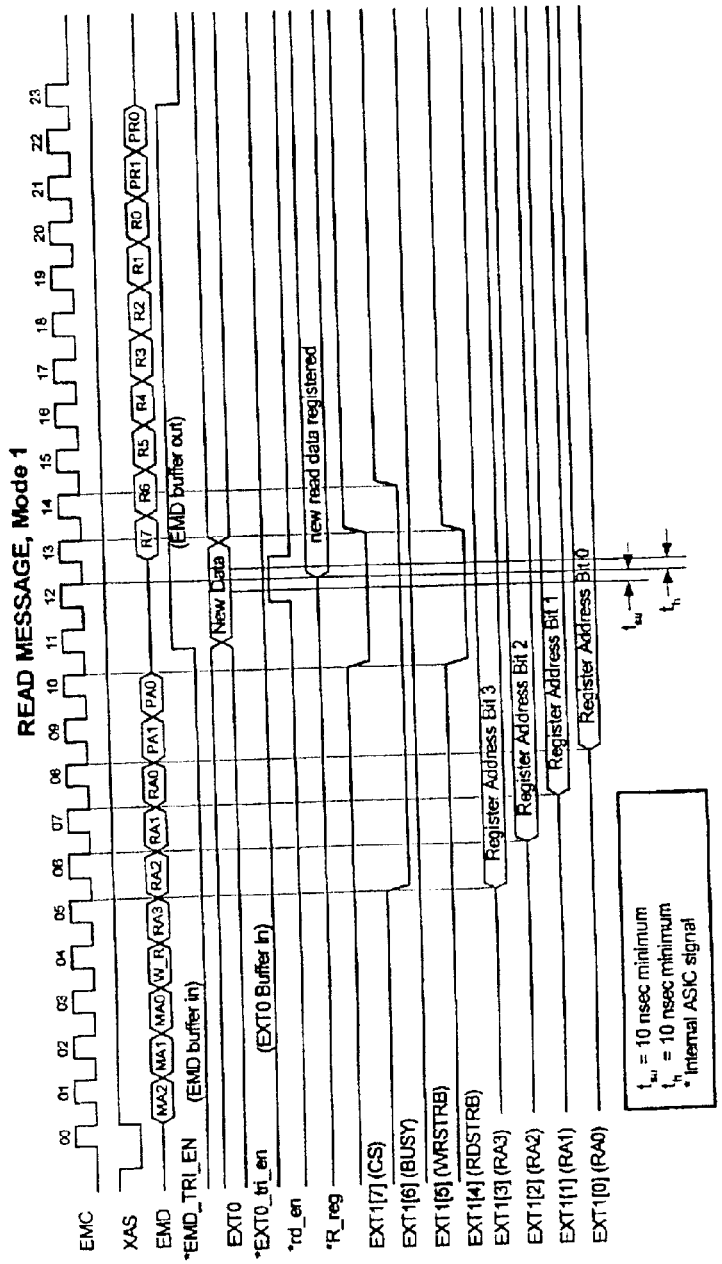

The EXT0 port operates as an active high, 8 bit bi-directional data port and EXT1 port consists of 8 bits of address and control. FIG. 9 includes a table 90 of the EXT1 address and control port in mode 1. The watch dog timer function can utilize signals EXP0, EXP1, and EXP2. The signal EXP4 is an input in mode 1 and can be referred to as WDTO. The watch dog timeout (WDTO) input is used on intelligent modules or a module containing a local processor. If the local processor's watch dog timer fires, then the WDTO signal becomes active high. The EM SLAVE ASIC responds to this input by returning all 1's to the PLC on any response message. For example, during a READ cycle, the EM SLAVE ASIC returns eight data bits of 1 and two parity bits of 1. The PLC recognizes a parity error on the READ data and does not process the information. The EM SLAVE ASIC allows modules downstream to communicate even when the WDTO has become active high. FIGS. 21 and 22 provide an example of a mode 1 Read and Write sequence and timing of these signals.

Mode 2 operation is specific to the non-intelligent analog modules and provides the required setup and control of a specific Analog to Digital Converter (ADC), Digital to Analog Converter (DAC), and Analog Input Multiplexer. The EXT0 bus is used as an 8 bit, active high, bi-directional data bus used to transmit and receive data with the DAC and ADC devices. The EXT1 bus is used to control the ADC and MUX devices and is illustrated in a table 100 of FIG. 10.

In mode 2, the signal EXP0, EXP1, EXP2, and EXP4 are used to control the DAC device and are illustrated in FIG. 2. Mode 2 operation follows a unique instruction sequence issued by the PLC to access the analog devices. A description of the PLC instruction sequence used in mode 2 is described further with respect to FIGS. 11 and 12. An illustration of the sequence and timing of these signals is described further with reference to FIGS. 24-31.

Referring now to FIG. 11, an analog input access sequence 110 is shown. Analog inputs are accessed in specific sequential instruction order by the PLC. If the PLC detects an error on any instruction during the sequence, then the PLC may re-try the failed instruction without having to start the sequence.

In a step 112, analog inputs are accessed from BANK 0 and the PLC selects a BANK 0 by writing the hex value 0 to register address $2_h$ (R2). In a step 114, BANK 0 has 4 MUX channels to select from and the PLC selects the MUX channel by writing any value to the most significant bit (MSB) location of the desired channel. In a step 116, ADC conversion is initiated by a PLC Write to the least significant bit (LSB) of the desired channel. In a step 118, after a specified amount of time, the PLC reads the MSB and a MSB read also resets the MUX device so that no inputs are selected. This is done in an attempt to reduce channel to channel crosstalk. In a step 119, the PLC Reads the LSB. The LSB Read transaction starts another ADC conversion, therefore the LSB value are stored in a temporary register in the ASIC. This allows the PLC to re-try the LSB Read again. A PLC Read of any one of the Status Registers or any Write transaction releases the temporary register.

Referring now to FIG. 12, an analog output access sequence 120 is shown. Analog outputs are accessed in specific sequential instruction order by the PLC. If the PLC detects an error on any instruction during the sequence, then the PLC may re-try the failed instruction without having to start the sequence over.

In a step 122, analog outputs are accessed from BANK 4. The PLC selects BANK 4 by writing the value $4_h$ to register address $2_h$ (R2). BANK 4 has up to four Analog Output Channels. In a step 124, the PLC selects the analog output channel by addressing the MSB of the desired channel. The MSB byte is written to the DAC during this transaction. In a step 126, the PLC then addresses the LSB of the desired channel. The LSB byte is written to the DAC and a short period later a DAC Load occurs.

The watch dog timer operation is now described in accordance with an exemplary embodiment. External pins EXP0, EXP1, and EXP2 are used to implement the watch dog function in Modes 0 and 1. One purpose of the watch dog is to disable all discrete outputs in the event that the CPU fails to communicate with the expansion module over a specified period of time. The watch dog timer function is enabled when the ASIC is in mode 0 or 1 operation. The watch dog is reset by the occurrence of XOD or a valid ACK returned to the CPU. If neither of these events occur then all outputs are cleared after the watch dog has timed out. Once the watch dog has timed out it remains idle until either XOD is issued or a valid ACK is returned to the CPU. In mode 0, the outputs are cleared internal to the ASIC. In mode 1, the signal EXP0 is used to clear the external registers and is referred to as EXT_CLR. The control port EXT1 is set to all one's if the watch dog times out.

Figure 13:
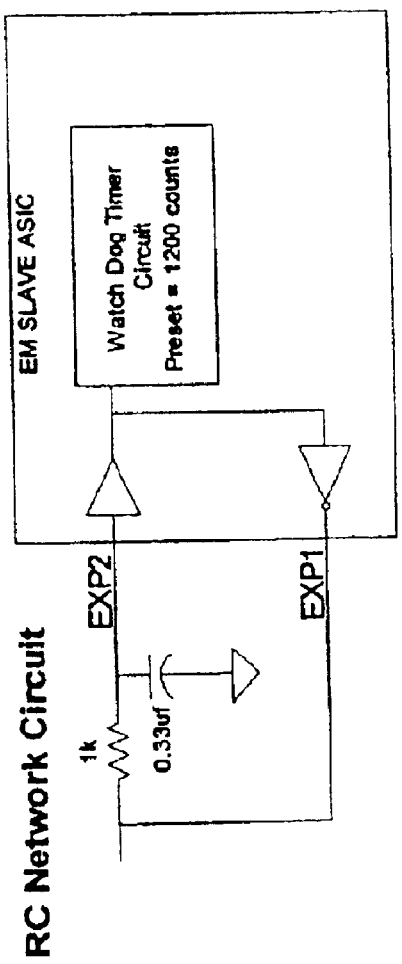
FIG. 13 is a circuit diagram that sets an oscillator period.
Figure 14:
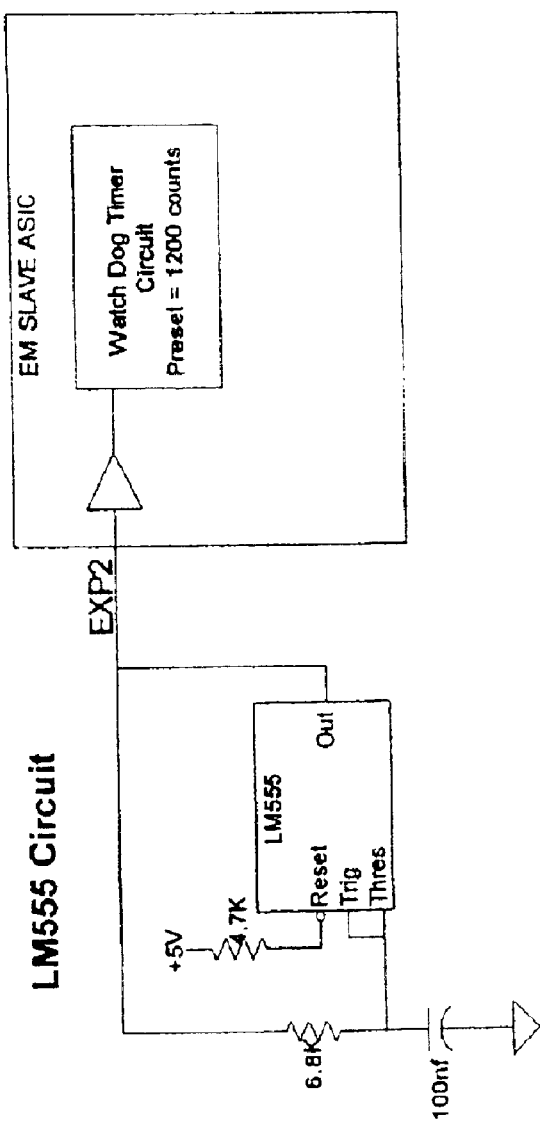
FIG. 14 is a timer circuit.

To implement the watch dog timer circuit, signal EXP2 is used as watch dog clock input (CLK_IN). An external oscillator circuit, such as a LM555 timer circuit, drives the "analog schmitt trigger" clock input EXP2. The EM SLAVE ASIC does provide an inverted clock output signal, EXP1, that can be used for feedback into an external RC network in the case the LM555 timer circuit is not used. FIG. 13 illustrates an RC network circuit 130 that sets an oscillator period of approximately 590 μsec. The EM SLAVE ASIC is preset to 1200 counts and given the oscillator period of 590 μsec, the watch dog period is approximately 708 msec. FIG. 14 illustrates a timer circuit implementation 140.

The expansion module (EM) SLAVE ASIC operation is described according to an exemplary embodiment. The EM SLAVE ASIC implements a state machine architecture to provide proper communication and control. There are two types of messages the PLC provides to the EM SLAVE ASIC: a WRITE message and a READ message. The first byte of either message is the CONTROL byte with two bits a parity. The EM SLAVE ASIC decodes the CONTROL byte and determines which EM module the PLC is addressing, the message type (READ or WRITE) and the register being accessed. The EM SLAVE ASIC generates two bits of parity on the received CONTROL byte and compares their values to the parity bits attached to the CONTROL byte. If the parity bits do not compare then the EM SLAVE ASIC issues an active ASIC_XAS for approximately 2.2 μsec. The ASIC_XAS is transmitted to the next module downstream via XAOD signal, thus preserving the state of the outputs.

The second byte of a WRITE message is the WRITE data byte with two parity bits. The EM SLAVE ASIC generates parity on the WRITE data byte and compares this value to the parity received with the WRITE data byte. If the values do not equal, then the EM SLAVE ASIC responds to the PLC with an invalid Acknowledge (11). In the case the parity values do equal, then the EM SLAVE ASIC responds to the PLC with a valid Acknowledge (01) and the output data bus is updated with new data. The Acknowledge data is transmitted to the PLC on the rising clock edge.

The second byte of a READ message is a response to the PLC from the EM SLAVE ASIC and consists of a READ byte and two parity bits generated by the EM SLAVE ASIC. The EM SLAVE ASIC transmits the READ data byte and parity bits to the PLC on the rising clock edge.

At initial power up, the PLC issues an active XOD signal. Detection of XOD places the state machine into its home state and discrete outputs and analog outputs are cleared. Also at initial power up, the EM SLAVE ASIC determines its Module Address (MA_IN), Mode of operation (Mode 0, 1, or 2) and propagates the next Module Address (MA_OUT) by incrementing its Module Address by one. Once XOD is released, the EM SLAVE ASIC latches the module address, MA_IN. A bus transaction is initiated when an active XAS signal is sampled on the rising edge of the clock. The state machine transitions from its home state to state 0 when XAS is sampled true. The state machine is initialized when entering state 0 and propagates to state 1 on the next rising clock edge. If at any time the XOD signal becomes active, then all outputs are asynchronously reset and the state machine returns to its home state.

Figure 15:
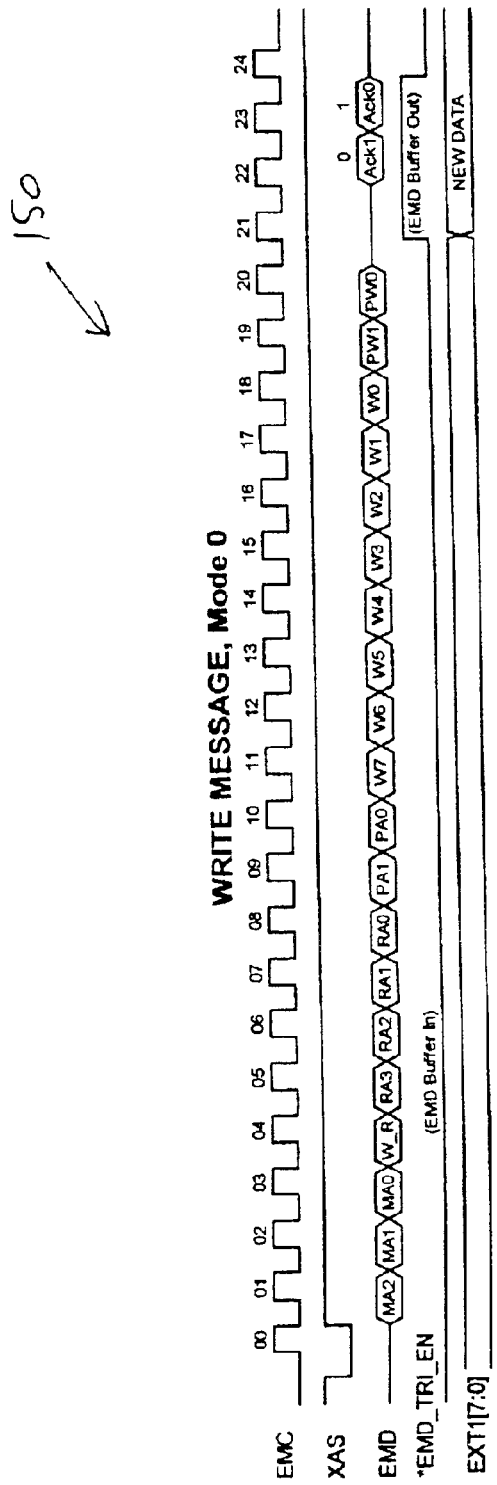
FIGS. 15-23 are timing diagrams of ASIC signals for various message types and conditions.

FIGS. 15-23 illustrate timing diagrams 150, 160, 170, 180, 190, 200, 210, 220, and 230 of EM SLAVE ASIC signals for various message types and conditions. Referring to FIG. 15, new data is enabled on the output port EXT1 on the rising edge of clock 21. In mode 0, EXT1 port is an active low output port.

Figure 16:
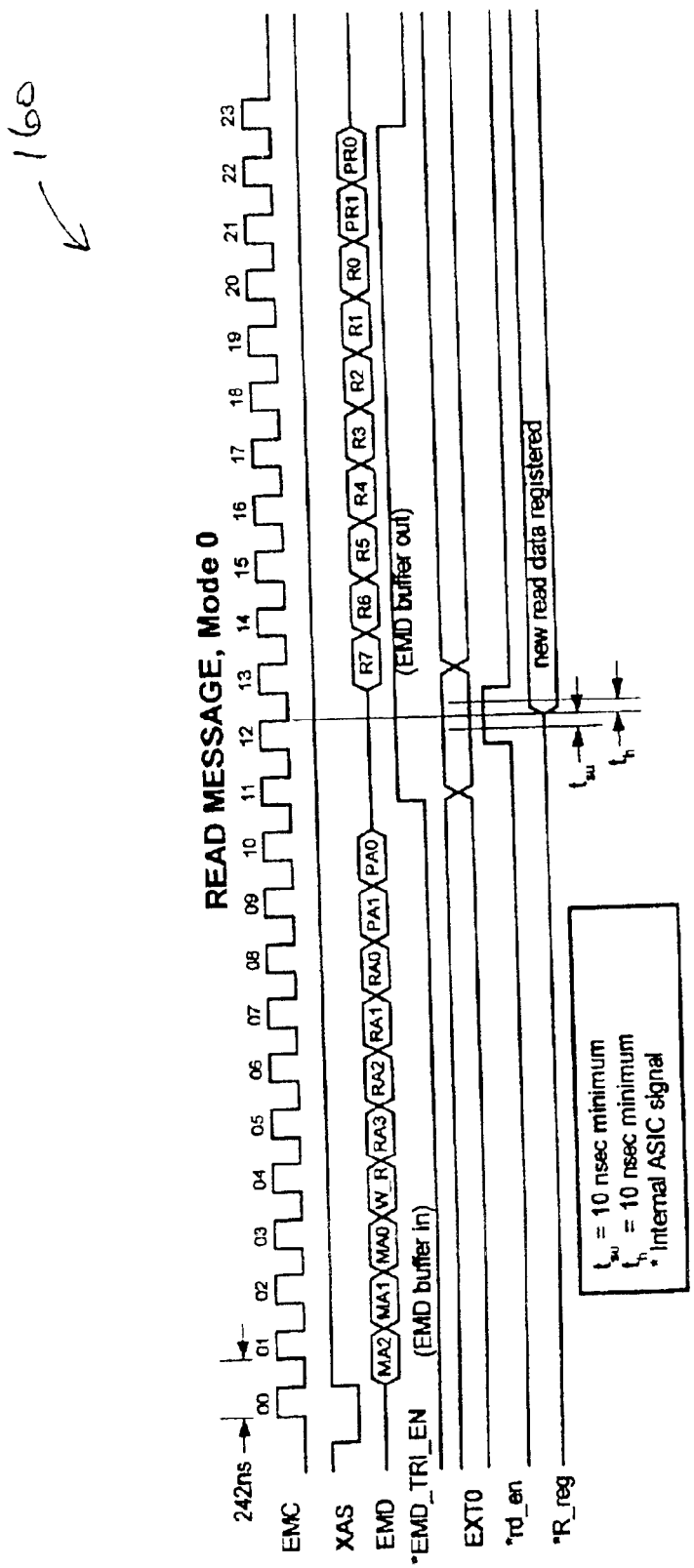

In FIG. 16, input data to external port EXT0 is enabled for one clock period and is registered internal to the ASIC on the falling edge of clock 12. The internal registered read data begins to serially shift out on the EMD signal on the rising edge of clock 13. The minimum register setup time is 10 nsec and the minimum hold time is 10 nsec.

Figure 17:
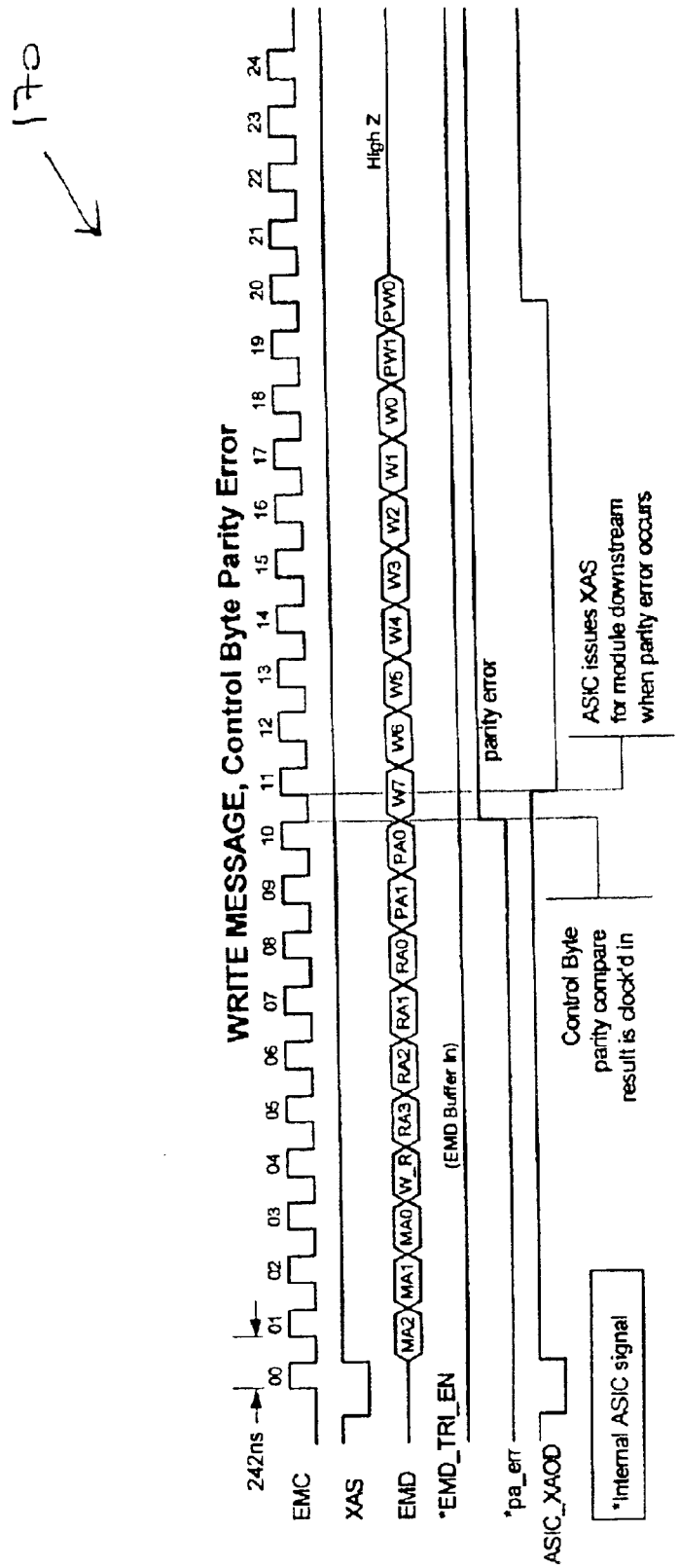
Figure 18:
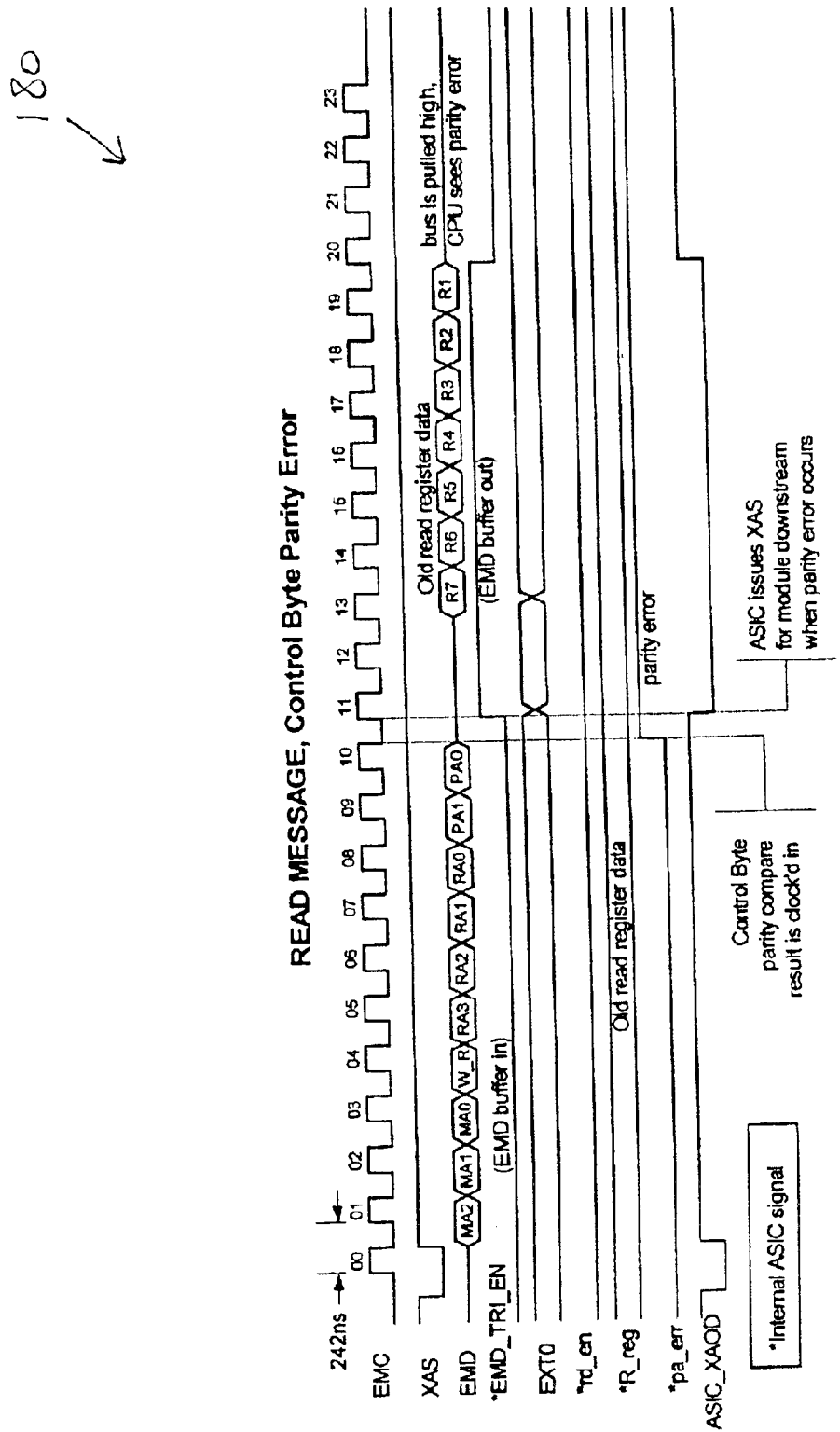

Referring generally to FIG. 17 and FIG. 18, the parity generated on the control byte is compared to the parity attached to the control byte and the result registered on the falling edge of clock 10. In the case where a control byte parity error is detected, then the EM SLAVE ASIC generates its own XAS signal and becomes active low on the rising edge of clock 11 and remains low for nine clock periods. The ASIC signal ASIC_XAS is gated with CPU generated signals XAS and XOD. The resulting output, ASIC_XAOD, is used as the XAOD signal for the next module downstream. The purpose of the ASIC generated XAS signal is to preserve the I/O data of expansion modules downstream when a parity error has been detected on the control byte. The EM SLAVE ASIC samples the XAS input signal on clocks 0 and 12 only. If the EM SLAVE ASIC samples an active XAS on clock 12, then it returns to its home state thus preventing invalid data from being written to the outputs.

Figure 19:
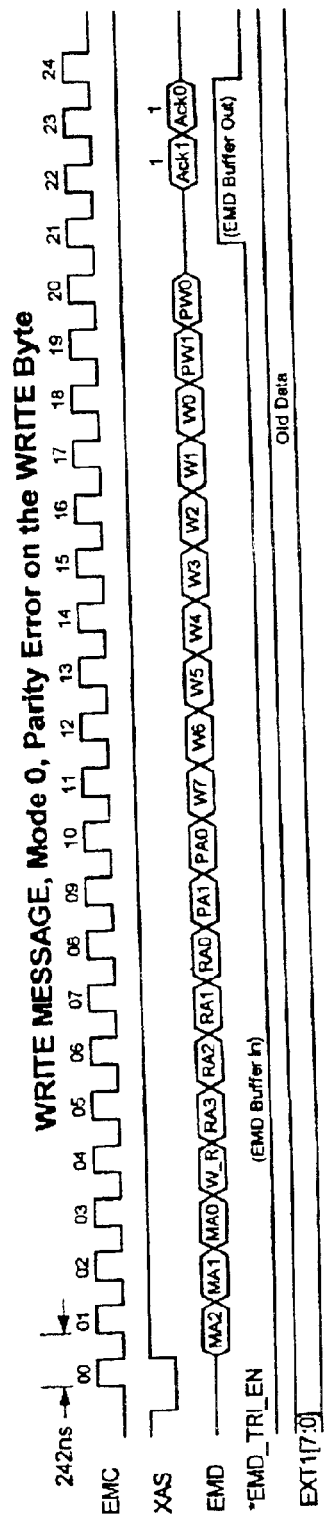

Referring to FIG. 19, the EM SLAVE ASIC responds to the CPU with an invalid Acknowledge and the EXT1 data is not updated with new data when a parity has been detected on the Write data byte. A parity error on the Write data byte does not generate an active ASIC_XAS signal as a parity error on the control byte does.

Figure 20:
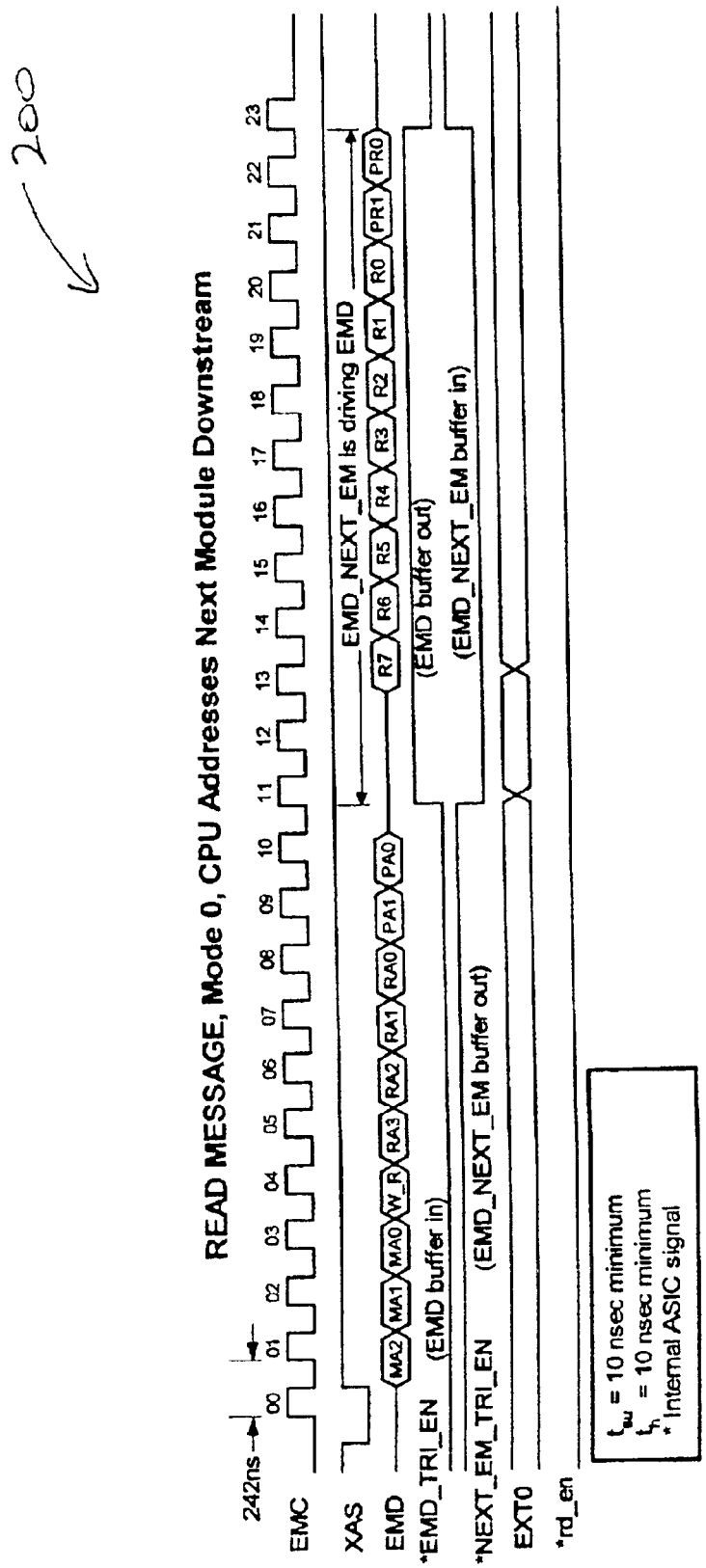

The READ Message in FIG. 20 illustrates the EM SLAVE ASIC response when the CPU has addressed an EM with a higher physical address. The READ Byte is driven by the module downstream that was addressed. Signals EMD_TRI_EN and NEXT_EM_TRI_EN show the direction control of the EMD bi-directional data buffers.

Figure 23:
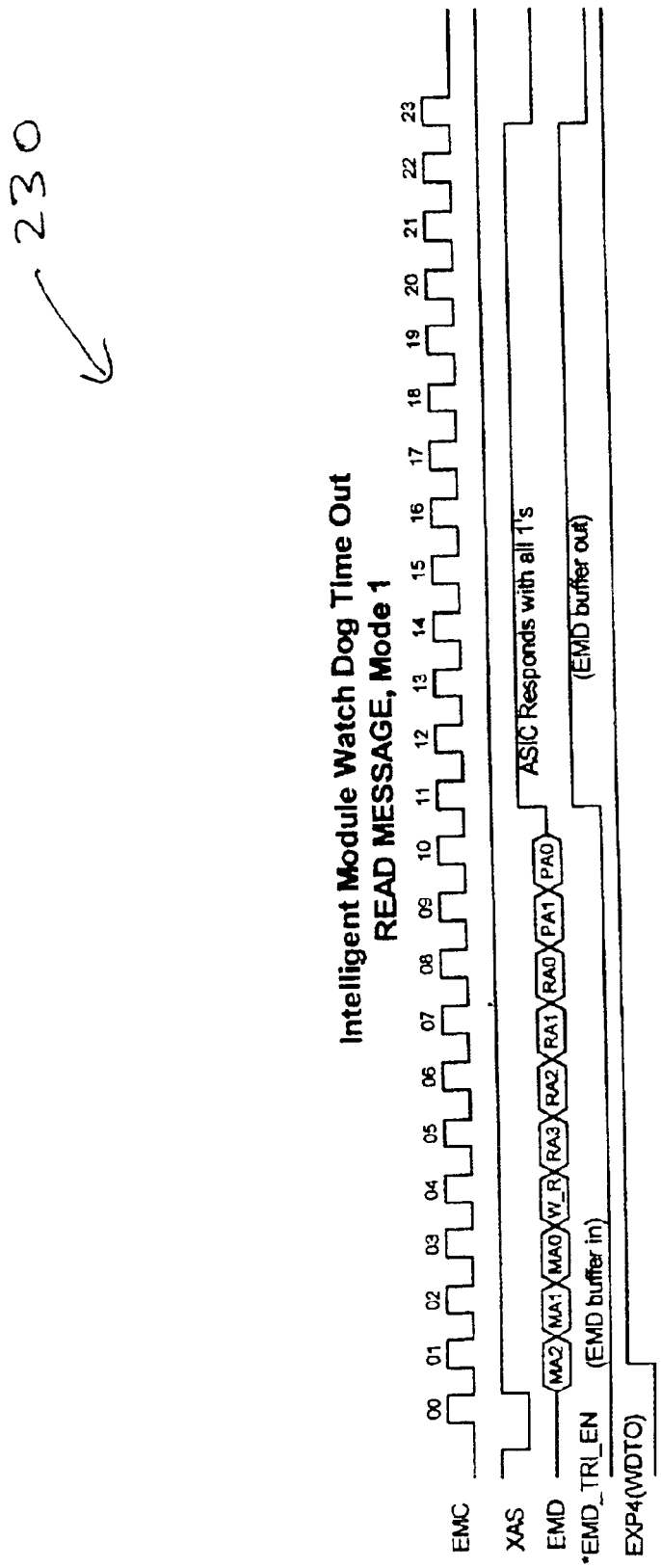

Referring now to FIGS. 21-23, in mode 1, the EXT0 port is an active high bi-directional data port and EXT1 port is used as eight bits of control.

With reference to FIG. 23, expansion modules that have an on board processor have a watch dog time out signal. The EM SLAVE ASIC provides an input, WDTO or EXP4, to monitor the state of the watch dog time out of the local processor. The EM SLAVE ASIC operates normally when WDTO is low. If the WDTO signal becomes high, the EM SLAVE ASIC responds to the CPU with all 1's during a Read Message response. This forces a parity error on the data read by the CPU, thus preventing the CPU from responding to invalid data. The EM SLAVE ASIC does not disable other modules that maybe connected to the system if the local processor has times out. In other words, the EM SLAVE ASIC responds appropriately to messages intended for other expansion modules even when the local processor has timed out.

The PLC accesses an analog input by issuing a specified sequence of instructions. FIGS. 24-28 illustrate timing diagrams of five exemplary instructions and show the timing requirements of the EM SLAVE ASIC in mode 2. The EM SLAVE ASIC allows the PLC to re-try any of the give instructions without having to start the sequence over.

Figure 24:
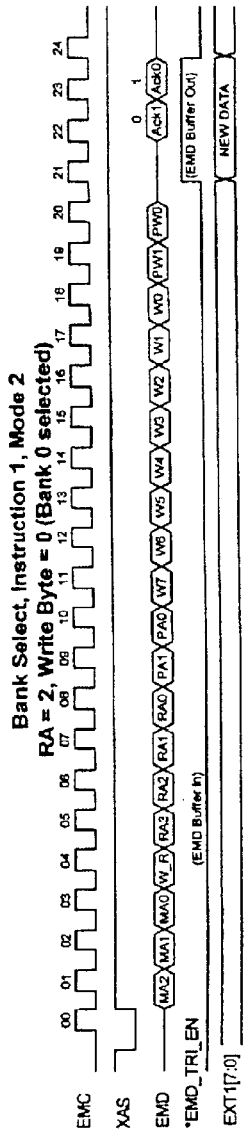
FIGS. 24-28 are timing diagrams of instructions in an analog input by a PLC.

Referring to FIG. 24, with the first instruction, the PLC selects bank 0 by writing $0_{hex}$ to register 2 or bank 1 by writing $1_{hex}$ to register 2. The EM SLAVE ASIC recognizes this to be the first instruction of an analog input sequence.

Figure 25:
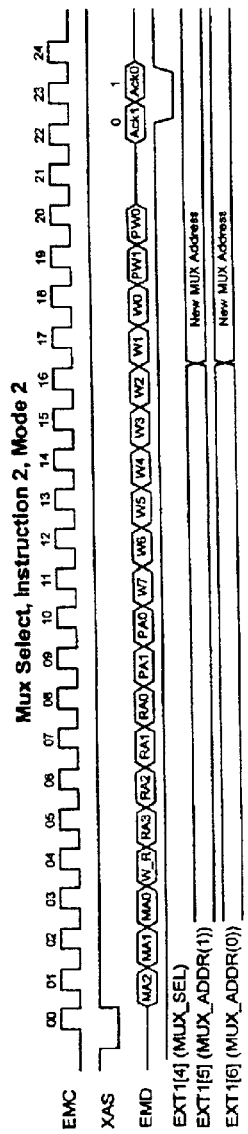

Referring to FIG. 25, with the second instruction, the PLC selects the input channel to read by writing any value to the MSB location of the desired input channel. The EM SLAVE ASIC decodes the message and causes the MUX to select the desired input channel.

Figure 26:
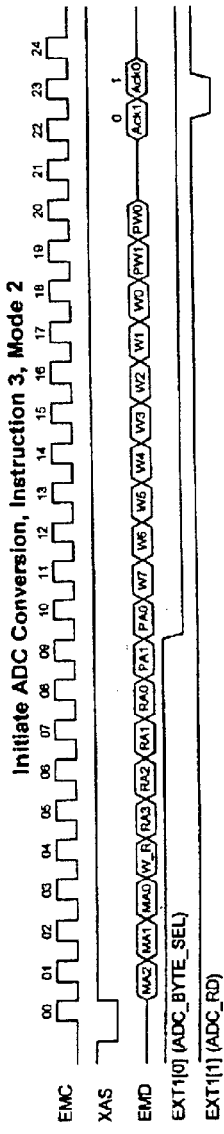

Referring to FIG. 26, with the third instruction, the PLC initiates the Analog to Digital conversion by writing any value to the LSB of the desired channel. The EM SLAVE ASIC decodes this message and causes the ADC_BYTE_SEL signal to go low and the ADC_RD signal to pulse low. These two conditions cause the ADC to start the conversion.

Figure 27:
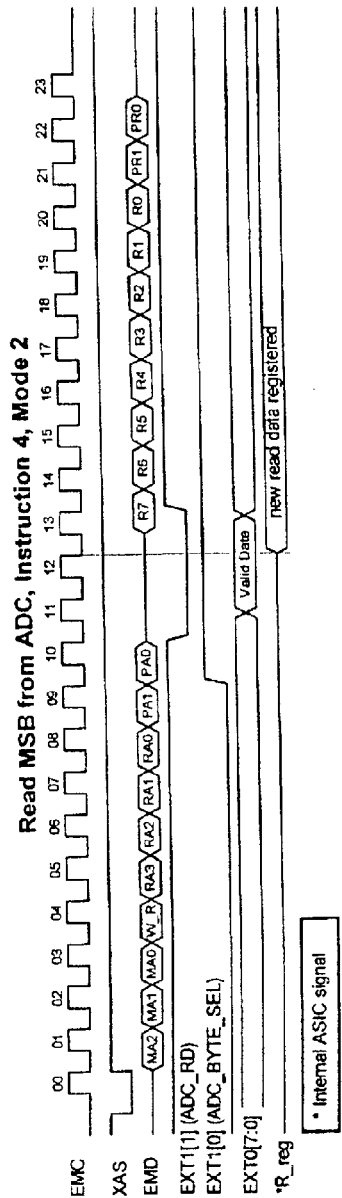

Referring to FIG. 27, with the fourth instruction, the PLC reads the most significant bit (MSB) of the converted analog signal. The EM SLAVE ASIC addresses the MSB by setting ADC_BYTE_SEL high and enables the MSB onto the EXT0 data bus on the falling edge of clock 10 and holding until the falling edge of clock 13. The EM SLAVE ASIC registers the MSB on the falling edge of clock 12 and begin shifting the new data back to the PLC on clock 13.

Figure 28:
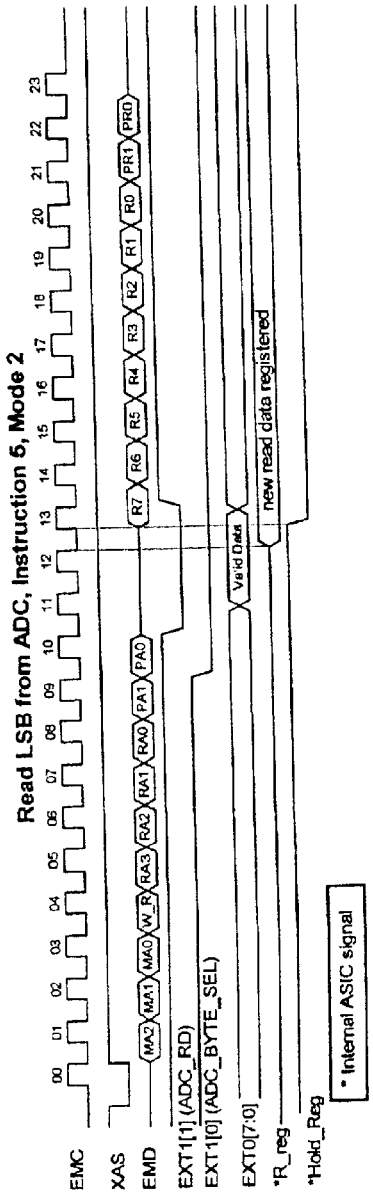

Referring to FIG. 28, with the last instruction, the PLC reads the least significant bit (LSB) of the converted analog signal. The EM SLAVE ASIC addresses the LSB by setting ADC_BYTE_SEL low and enables the LSB onto the EXT0 data bus on the falling edge of clock 10 and holding until the falling edge of clock 13. The LSB is registered on the falling edge of clock 12 and begins shifting the new data back to the PLC on clock 13. The LSB Read instruction also causes the ADC to initiate a new conversion and therefore the LSB is placed in a temporary holding register internal to the ASIC. This allows the PLC to re-try the last instruction and receive valid data. The holding register is released on any Write transaction or any status register Read transaction.

Figure 29:
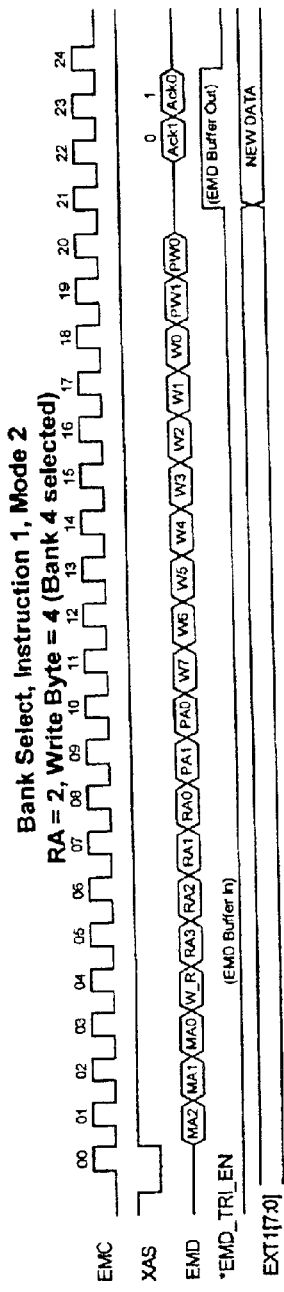
FIGS. 29-31 are timing diagrams of instructions in an analog output by a PLC.
Figure 30:
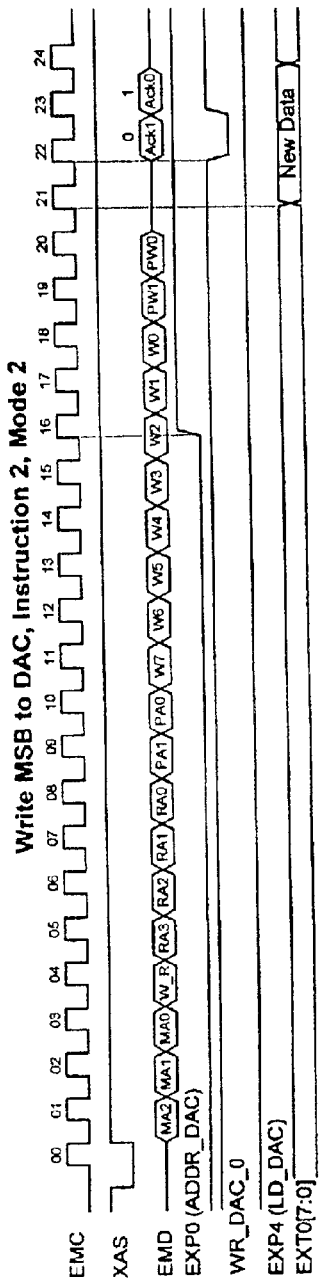
Figure 31:
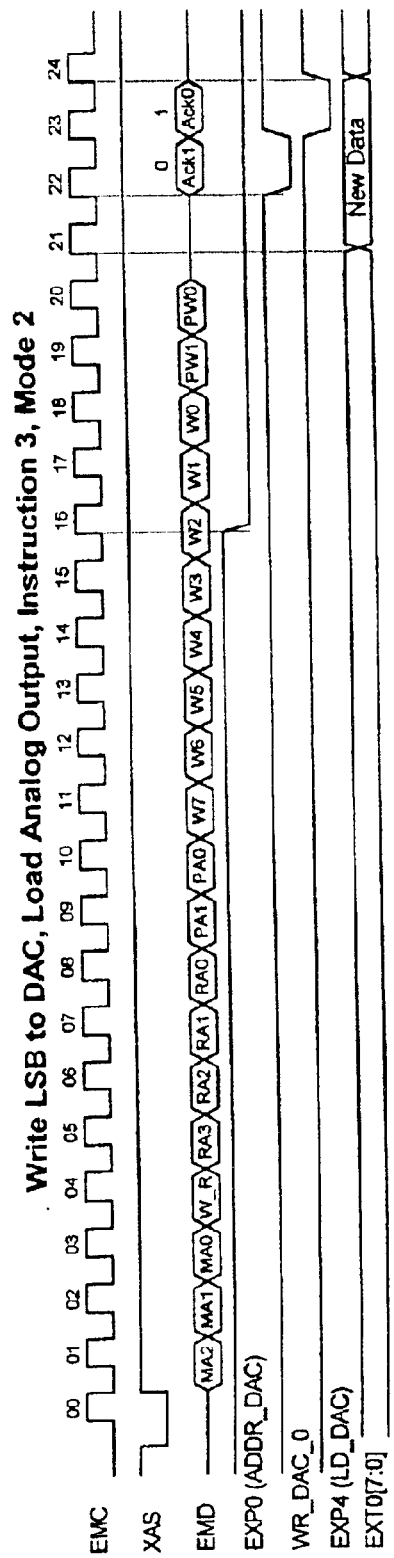

The PLC accesses an analog output by issuing a specified sequence of instructions. FIGS. 29-31 illustrate timing diagrams of three exemplary instructions and show the timing requirements of the EM SLAVE ASIC in mode 2. The EM SLAVE ASIC allows the PLC to re-try any of the three instructions without having to start the sequence over.

Referring to FIG. 29, with the first instruction, the PLC selects bank 4 by writing $4_{hex}$ to register 2. The EM SLAVE ASIC recognizes this to be the first instruction of an analog output sequence.

Referring to FIG. 30, the PLC selects the analog output channel by writing to the MSB location of that channel. The MSB also is written to the digital to analog converter during this instruction. The ME SLAVE ASIC sets ADDR_DAC high on the rising edge of clock 16. The MSB is enabled onto the bus on the rising edge of clock 21 and is enabled into the DAC latch on the rising edge of clock 22. The MSB is latched into the DAC on the rising edge of clock 23.

Referring to FIG. 31, with the last instruction, the PLC addresses the LSB of the desired channel and write the LSB value to the digital to analog converter. The EM SLAVE ASIC pulls the ADDR_DAC signal low on the rising edge of clock 16. The LSB is enabled onto the EXZT0 data bus on the rising edge of clock 21 and enabled into the DAC latch on the rising edge of clock 22. The rising edge of WR_DAC_0 causes the DAC to latch the LSB and the rising edge of LD_DAC causes the digital to analog conversion While the exemplary embodiments illustrated in the figures and described above are presently preferred, it should be understood that these embodiments are offered by way of example only. Other embodiments may include, for example, a variety of different smart cables. The invention is not limited to a particular embodiment, but extends to various modifications, combinations, and permutations that nevertheless fall within the scope and spirit of the appended claims.

What is claimed is:

1. A method of preventing the writing out of invalid data by a communication interface that interfaces a controller and input/output (I/O) devices, the method comprising:

decoding a control byte in a message communicated from a controller to an application specific integrated circuit (ASIC), the control byte having parity bits;

determining which expansion module (EM) of a number of expansion modules is being addressed by the controller and what type of message is being communicated;

generating parity bits;

comparing the generated parity bits to the parity bits attached to the control byte; and if the parity bits do not match, issuing a signal to preserve output states for the number of expansion modules.

2. The method of claim 1, wherein determining which expansion module (EM) of a number of expansion modules is being addressed by the controller and what type of message is being communicated further comprises determining which register is being accessed.

3. The method of claim 1, wherein the message communicated from a controller to an ASIC is a Write message.

4. The method of claim 1, wherein the message communicated from a controller to an ASIC is a Read message.

5. The method of claim 4, wherein a second byte of the Read message includes the parity bits generated by the ASIC.

6. The method of claim 1, further comprising, if the parity bits match, allowing the number of expansion modules to continue operation.

7. The method of claim 1, wherein the number of expansion modules is seven expansion modules connected together in a daisy chain fashion.

8. The method of claim 1, wherein the issued signal is an error detection signal transmitted to a next expansion module downstream.

9. The method of claim 1, wherein the issued signal is active for 2.2 $\mu$seconds.

10. A communication interface apparatus that responds to a communication protocol for interfacing expansion modules for reading and writing discrete input/output (I/O), analog I/O, intelligent module control and expansion module status, the apparatus comprising:

means for decoding a control byte in a message communicated from a controller, the control byte having parity bits;

means for determining which expansion module (EM) of a number of expansion modules is being addressed by the controller and what type of message is being communicated;

means for generating parity bits;

means for comparing the generated parity bits to the parity bits attached to the control byte; and means for if the parity bits do not match, issuing a signal to preserve output states for the number of expansion modules.

11. The apparatus of claim 10, further comprising a first mode of operation that accommodates a first discrete input/out device.

12. The apparatus of claim 11, further comprising a second mode of operation that accommodates a bus interface used by modules requiring more than eight inputs and outputs.

13. The apparatus of claim 12, further comprising a third mode of operation that accommodates control of non-intelligent analog modules.

14. A system that provides serial communication to expansion modules to read and write discrete input/output, analog input/output, intelligent module control, and expansion module status, the system comprising:

state machine architecture that provides communication and control to a number of expansion modules; and a controller that provides to the state machine architecture read messages and write messages, the first byte of the read messages and write messages including control information and parity bits, wherein the state machine architecture is configured to:
  decode the control information from the controller;
  determine which of the number of expansion modules is being addressed by the controller and whether the message from the controller is a read or write message;
  generate test parity bits;
  compare the parity bits from the controller with the test parity bits; and
  communicate an error detection signal to the number of expansion modules if the parity bits from the controller and the test parity bits do not match.

15. The system of claim 14, wherein the state machine architecture is implemented in an application specific integrated circuit (ASIC).

16. The system of claim 15, wherein the ASIC includes bi-directional buffers.

17. The system of claim 15, wherein the ASIC has three modes of operation: a first mode for discrete input/output having 8 inputs/outputs or less, a second mode for discrete input/output having more than 8 inputs/outputs, and a third mode for setup and control of non-intelligent analog modules.

18. The system of claim 17, wherein a watch dog function is implemented to disable all discrete outputs when the controller fails to communicate with one of the number of expansion modules over a period of time.

19. The system of claim 18, wherein the watch dog function is enabled during the first and second modes of operation.

20. The system of claim 14, wherein the error detection signal is communicated at least 2.2 $\mu$seconds.

* * * * *